United States Patent [19]

Borg et al.

[11] 4,050,670

[45] Sept. 27, 1977

[54] VARIABLE FORCE ACTUATOR

[75] Inventors: Karl S. Borg, Sudbury; Gareth A. Keith, Sherborn, both of Mass.

[73] Assignee: Masoneilan International, Inc., Norwood, Mass.

[21] Appl. No.: 655,453

[22] Filed: Feb. 5, 1976

[51] Int. Cl.² .......................................... F16K 31/115
[52] U.S. Cl. ........................................ 251/14; 74/110; 251/58; 251/229; 251/231; 251/279
[58] Field of Search ...................... 74/110; 251/14, 58, 251/229, 213, 279, 280, 308, 231, 232, 233

[56] References Cited

U.S. PATENT DOCUMENTS

| 1,295,638 | 2/1919 | Triggs | 251/58 |
| 2,169,126 | 8/1939 | Repka | 74/110 |
| 2,461,034 | 2/1949 | Castle | 74/110 |
| 2,646,074 | 7/1953 | Hopkins | 251/279 |
| 2,919,885 | 1/1960 | Daigle | 251/308 |
| 3,000,242 | 9/1961 | Barrett | 74/110 |
| 3,684,237 | 8/1972 | Hyde et al. | 251/58 |

Primary Examiner—Martin P. Schwadron
Assistant Examiner—G. L. Walton
Attorney, Agent, or Firm—Robert A. Townsend

[57] ABSTRACT

An actuator for reciprocating stem control valves having a linkage system affording variable force, reversible action, and adaptability to different valve strokes.

19 Claims, 10 Drawing Figures

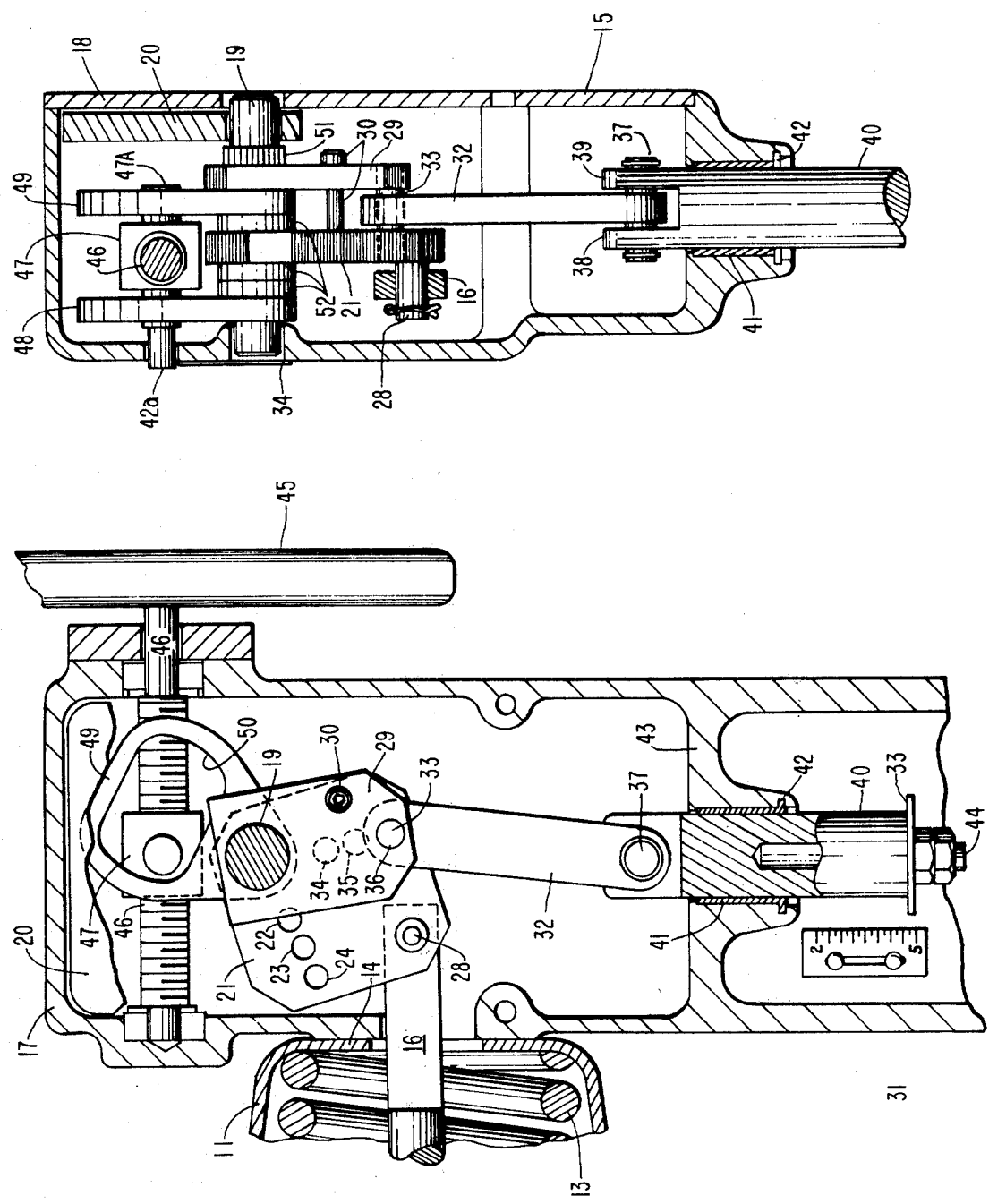

VARIABLE FORCE ACTUATOR

BACKGROUND OF THE INVENTION

Heretofore, the herein concerned actuators, as employed, for typical example, with single port globe values in 1-6 in. control applications, have been beset by these following problems, all uniquely solved by this invention:

1. Non-achieving of wanted or required high stem or seating force, with no more than normal plant air system or controller output supply pressure, and without excessive increase in diaphragm size.
2. Non-providing of degree of actuator stiffness required for valve stability, i.e., of positive rate of actuator-induced stem force change (with actuator stroke) exceeding a negative rate of flowing-medium-induced stem force change (with actuator stroke).
3. Compression spring differentiation for, or more generally non-convertability as between, normally closed and normally open operation.
4. Non-standardization of spring location and size.
5. Varying mountings and constructions of auxiliary hand wheels.

SUMMARY OF THE INVENTION

A valve actuator incorporating a new and improved force modification system or linkage, by which is achieved high or multiplied seating force; exceptional stability; characterized, non-linear valve stem motion; precise control of stem motion near full seating of the valve; and standardization of parts.

An actuator having a low air pressure requirement of, say, twenty p.s.i.g. supply pressure, whereby it is capable of direct controller operation, and with low air consumption.

An actuator design distinguished by a novel lever assembly providing, in a single unit of compact design, both field reversibility and multiple strokes, with the same standard parts.

An actuator having a integral hand wheel control which is continuously connected and bi-directional in operation, and which is additionally distinguished by adjustable stop and low rim force features.

BRIEF DESCRIPTION OF THE DRAWINGS

In the following drawings:

FIGS. 6 and 7 are larger scale, constructional detail views, front and side, of an actuator in the FIG. 3 setup;

DETAILED DESCRIPTION OF THE INVENTION

Figures 1, 2:
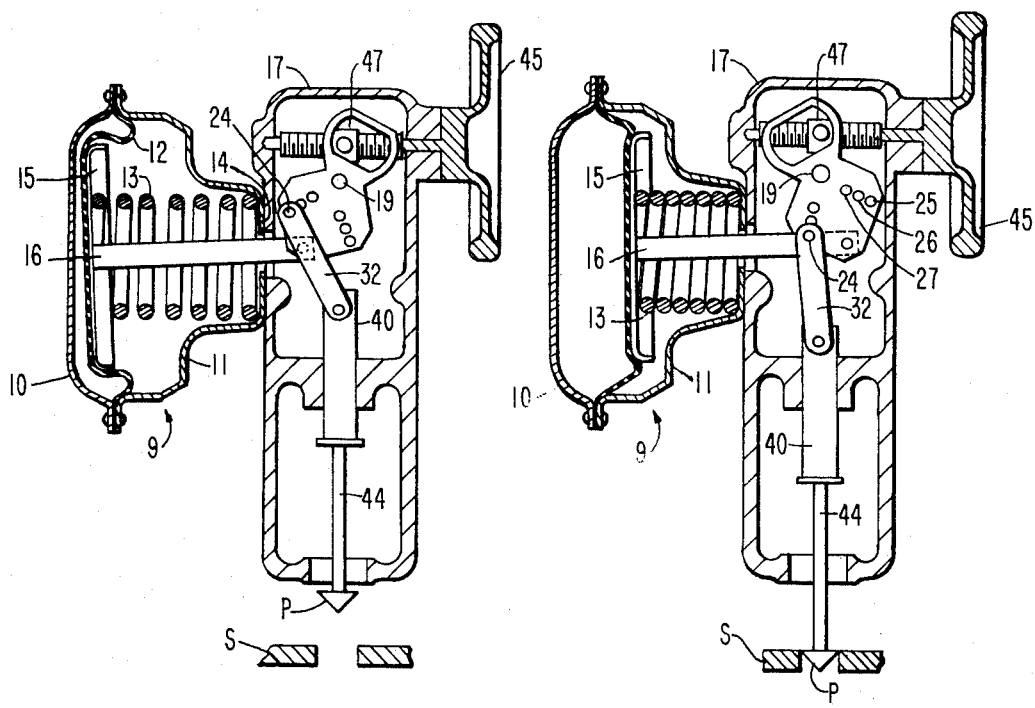
FIG. 1 is a partly schematic illustration of an air-to-close setup of the actuator, in the open position.
FIG. 2 similarly shows the FIG. 1 actuator in the closed position.

The actuator comprises a powerhead, generally indicated 9, having an enclosing upper case 10 and lower case 11 provided with mated peripheral margins between which is sealed a flexible or rolling diaphram 12, the left side of which is subject to plant air or positioner or controller output as supplied through upper case 10.

The controller air pressure is counter-balanced by a coil or other spring 13 compressed between lower case end wall 14 and plate or cup 15 to the opposite wall of which the diaphragm 12 is face-engaged as shown.

Input thrust rod or stem 16 is screwed or otherwise fixed to plate 15, and extends through the central opening in lower case end wall 14 within which it is shiftable and also rockable by the flexing of spring 13 and diaphram 12 subject to control fluid pressure, such as controller or positioner output pressure, or plant air pressure, on said diaphram.

The powerhead 9 is bolted or otherwise secured at its end wall 14 to one side wall of a vertically elongate housing or yoke 17, and for extension of the stem 16 laterally through a side wall opening into the yoke interior, to which access is given by the forming of another side wall thereof as a removable cover plate 18.

Yoke 17 is fitted as conventionally for mounting on the body of a valve, such as a single port global valve, having a projecting, reciprocating plug stem, and in line with and so as to embrace or enclose said stem.

The variable force linkage system of the actuator comprises within yoke 17 a support shaft 19 journalled in a yoke side wall, FIG. 7, and in bearing plate 20 behind cover plate 18. Support shaft 19 defines the main pivot bearing for the actuator linkage, and is located on the valve stem axis.

The linkage system or lever assembly further comprises a main lever 21 received on support shaft 19, and which is plateformed to an angular width to encompass two sets of link pin holes 22, 23, 24, and 25, 26, 27, the said hole sets on radial lines from, and at the corresponding radial distances from, the main lever support shaft or pivot 19.

For controller input to the linkage system, lever 21 mounts a pivot pin 28, located on a radial line from pivot 19 that bisects the angle included between the radial lines of hole sets 22-24 and 25-27, and which is rotatively engaged in the end of stem 16 that projects within the yoke 17.

Supported also on shaft 19 is an auxiliary or support level 29 that may be rotatively keyed to main lever 21 by a threaded bolt 30 by which the lever 29 is received and releasably retained against removal from shaft 19, which removal is otherwise allowed by removal first of cover plate 18 and then of bearing plate 20.

The output side of the lever assembly comprises a link 32 pivoted at its upper end on a bearing pin 33 extending between main and support levers 21, 29 for reception in any of lever 21 holes 22-24 and 25-27, and in the corresponding hole of the lever 29 set 34-36, lever 29 being rotatable, relative to lever 21, to juxtapose its said hole set 34-36 to either of lever 21 hole sets 22-24 and 25-27.

Link 32 extends within yoke 17 downwardly away from pivot 19, and pivots, from its other or lower end, towards and away from the yoke or valve stem axis, with the pivoting of levers 21, 29 by the actuator input shifting of stem 16.

The link 32 lower end is engaged by a pin 37 passed or threaded through ears 38, 39 of a stem connector 40 for reciprocating of said connector 40 in axial, side-thrust bearing sleeve 41 removably seated, as behind expanding spring clip 42, in internal shoulder or bridge portion 43 of yoke 17.

The stem connector or solid shaft 40 is threadedly or otherwise connected to the valve plug stem 44 for reciprocating that between downward and upward or extended and retracted, valve closing-opening limit positions, the valve closing position being schematically shown in FIGS. 1-14 5 as the lowering of plug P to engage against seat S.

Improved means are provided for manually or adjustably limiting overriding the pressure-responsive valve positioning by the actuator, comprising a hand wheel 45 turning a screw 46 journalled in the yoke 17 for travelling therealong a crosshead 47. The crosshead 47 has a normal or neutral position in which it is not engaged by levers 48, 49 received over shaft 19 and having openings 50 of suitably greater horizontal extent than the crosshead bearing stems 47a received therethrough, FIG. 7.

Providing said neutral, disengaged hand wheel 45 position, the levers 48, 49 are oriented about shaft 19 such that their centerlines are on the line of centers of shaft 19 and pivot 28. When midway of screw 46, then, the crosshead 47 is in a neutral position of disengaement with the levers 48, 49 as lever 21, by its pivot 28, rotates about shaft 19 between the limit or full close-open positions of the valve. Thus when the crosshead 47 is moved in either direction from the neutral position by manipulation of the hand wheel 45, it is brought into bearing or stopping engagement with one or the other opposite ends of the hand wheel lever openings 50.

The manual or hand wheel control hereof will be seen from the foregoing to be continuously connected or ready to use without the requirement of first actuating a clutching mechanism or the like.

The hand wheel 45 is further distinguished by low required rim force, or easy operation, in that it is coupled as described to the input side of the actuator linkage, and hence requires, for its driving of levers 48, 49 to rotate shaft 19, only the same low force as is required of stem 16 to rotate shaft 19.

The hand wheel has been further shown to be bi-directional in operation, from its aforementioned neutral position, and in that to be capable, by virtue of its described input side connecting, of manual manipulation with ease or low force to override whatever plug force, in shifting the valve stem in either direction and including to the full open or full closed position.

From the foregoing it will also be seen that the hand wheel is operable manually or adjustably to limit stop the valve stroke, as well as to override or replace the actuator input.

Figure 8:
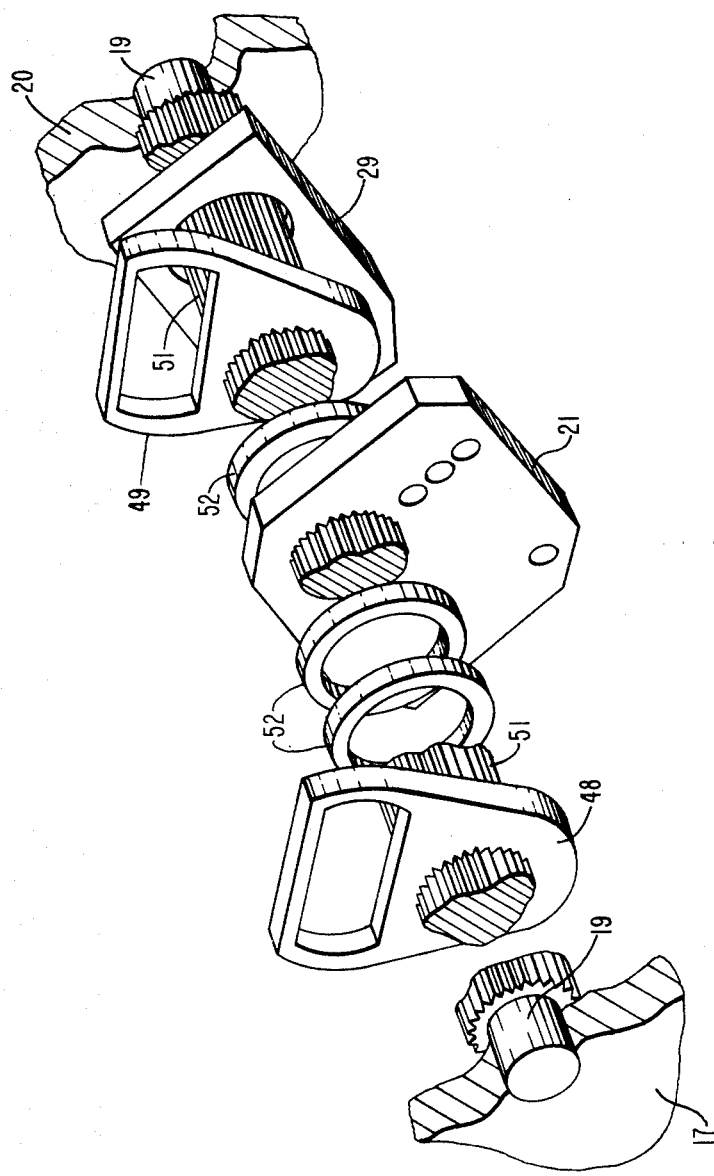
FIG. 8 shows the support shaft and engagement thereto of elements of the lever assembly and hand wheel control.

For their described orienting about shaft 19, and torquing of the actuator linkage, the hand wheel levers 48, 49 are rotatively interlocked with main lever 21, by being made commonly rigid with shaft 19 through their mating interfitting respectively with shaft splines 51, about which support lever 29 has a loose fit, FIG. 8, as do spacer rings or collars 52.

The actuator produces, for the same, relatively long, constant input stroke of the control-pressure-responsive actuator powerhead 9, and by the described linkage, a variable output stroke and force adapted to the stroke of the particular valve with which the actuator is to be used, this by pinning the link 32 to the main lever 21 at the appropriate radius, of whichever is selected of the same-radius mounting or opening pairs 22–24 or 25–27, and 34–36.

The main lever end support and link pivot openings or bearings may of course be provided in the number and radii from the lever pivot 19 that are dictated by application requirements. The hole or lever-link bearing locations may be such, for example, that the actuator output strokes for the hole pairs 22, 25 and 23, 26 may be one half and three fourths respectively of the output stroke for the hole pair 24, 27. Thus, FIG. 5a, wherein the link 32 is connected at 24–36, indicates a valve stroke twice that of FIG. 5b, wherein the link 32 is connected at 22–34.

Figures 3, 4:
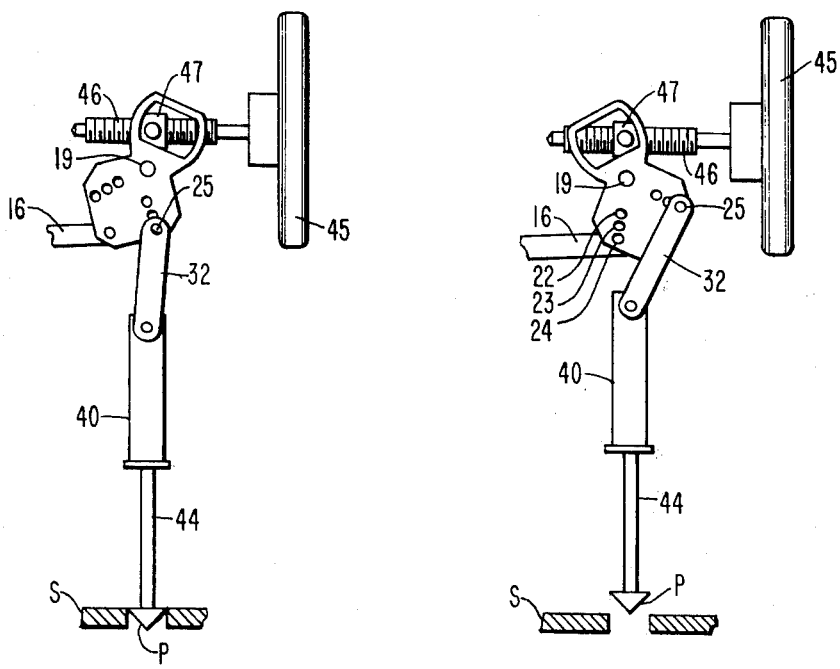
FIG. 3 similarly shows the linkage of an air-to-open setup of the actuator, in the closed position.
FIG. 4 similarly shows the FIG. 3 linkage in the open position.
Figure 5A:
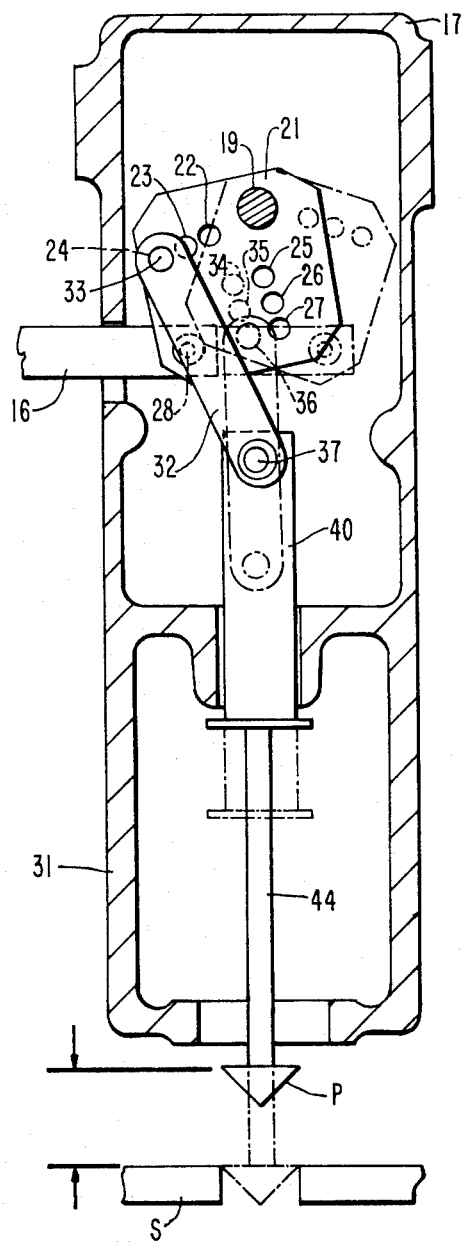
FIG. 5a similarly shows open and closed positions of an air-to-close actuator with the linkage arranged for one stroke selection.
Figure 5B:
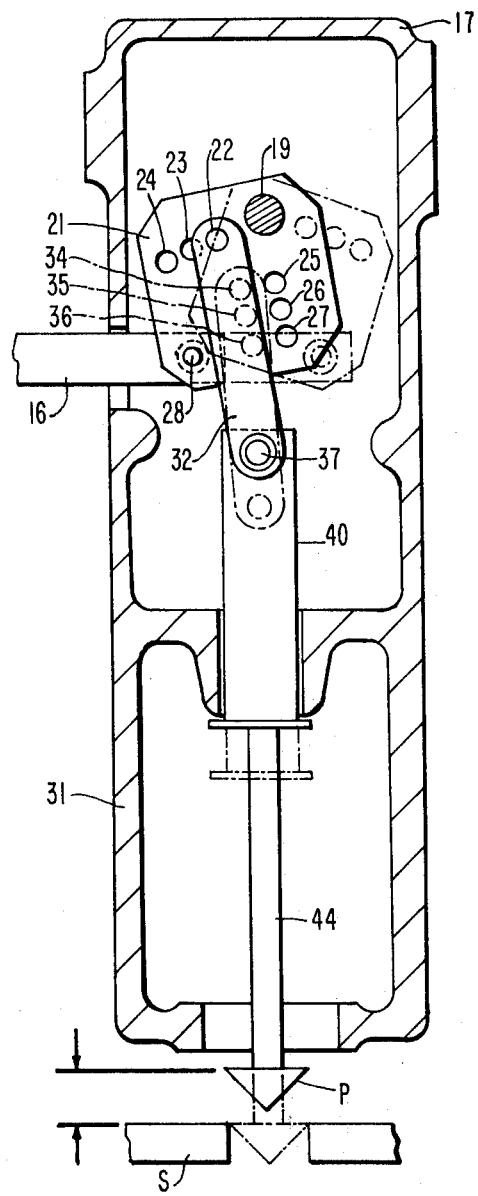
FIG. 5b shows the FIG. 5a actuator setup and positioning, but with the linkage arranged for another stroke selection.

As herein before explained, change of the setup from air-to-close, FIGS. 1 and 2, to air-to-open, FIGS. 3 and 4, or vice-versa, merely requires shifting the link 32 attachment from one to the other of the hole sets 22-23-24 and 25-26-27.

In accordance with the invention, the maximum actuator output force is developed when the stem 40 is fully extended, whether in the air-to-close or air-to-open setup. For the same input force, of whatever control pressure is applied to diaphram 12, the output force increases as the link 32 is swung from the FIG. 1 toward the FIG. 2, and from the FIG. 4 towards the FIG. 3, position. Maximum output force is thus developed when it is most needed, that is, when the stem 40 is extended for advancing a down-seating valve plug to the seated position. Said maximum force is suitably limited by attaching the link 32 to main lever 21 at, or spacing the holes 22–24 and 25–27 from the line of centers 19–28 by, an angle such that the link 32 is swung close to but does not reach, congruence with the valve stem axis, upon the full open or close input stroke of the actuator.

The variable stroke of the actuator, or rate of change of output stroke with respect to input stroke thereof, is thus minimum when the stem is fully extended, and increases to a maximum as the stem is moved to its fully retracted position. This invention thereby affords a valve trim flow characteristic which is an equal percentage (as opposed to linear) characteristic, and hence counteracts the undesirable effects of system flow resistance, which latter has the opposite tendency of flow characteristic modification towards quick opening, when a valve is installed in series therewith.

The actuator is additionally characterized by variable stiffness, the maximum output stiffness being developed when the stem is fully extended, the powerhead 9 stiffness being then increased at the output stem 40 by the square of the mechanical advantage, disregarding frictional losses. The advantage of actuator stiffness increase with stem extension is of course that the maximum rate of change of fluid forces acting on the valve plug generally occurs in the movement thereof which is closest to the valve seat.

The input or powerhead stroke is, again, a constant of, say, 2½ inches, that being readily attainable with conventional constructions of the diaphram 12, and reasonable or practical dimensions of the compression spring 13. The mechanical advantage being expressed by the instantaneous input-output stroke relation, the maximum force of an output stroke of, say, one inch is, then, typically a five times multiplication of the actuator input stroke force when the stem is fully extended. Thus for an air-to-retract stem action, and an initial actuator spring compression of 500 pounds, the maximum output force, or thrust on the valve stem 44, would be 2,500 pounds (neglecting friction). The relative radii, or distances from the shaft 9, of the stem 16 and link 32 connections to the main lever 21, can be such as variously produce, with the same actuator design and parts, mechanical advantages of up to 10 to 1.

With its actuator output forces far exceeding valve forces even at high pressure drops, tighter shutoffs are obtained by the invention, and with exceptional plug stability, especially near the seat, while maintaining precise control.

It will be seen that the invention actuator may be employed with a linear-flow-characterized valve plug, because the actuator linkage converts that linear plug characteristic always to an equal percentage characteristic, or a characteristic in the range from linear to, say, 50:1 equal percentage, or greater if desired. Thus, the actuator hereof, in general purpose applications as aforementioned, achieves superior response and precise positioning at low flows, and compensates for changes in pressure drop because of line loss in series with the control valve.

Figure 9:
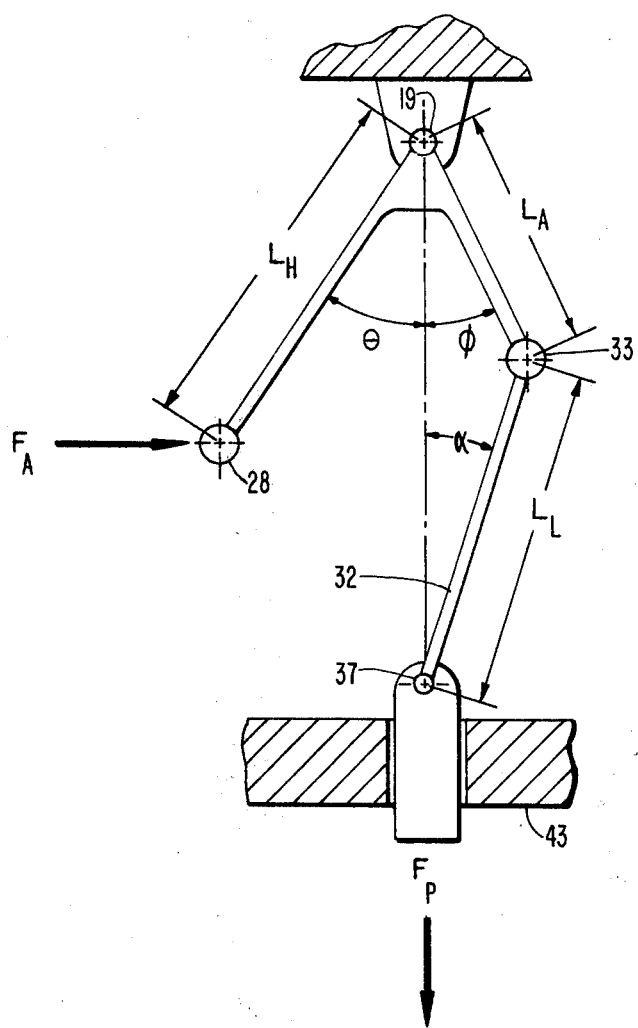
FIG. 9 is a force and motion diagram.

In the invention linkage as shown in FIG. 9, $\theta$ = the angle from the stem axis of input thrust rod connection 28

$\phi$ = the angle from the stem axis of output thrust link connection 33

$\theta + \phi$ = constant $\alpha$ = the angle from the stem axis of the link-stem connection 37

$\theta_o, \phi_o, \alpha_o$ = the angles when the stem is fully extended $Y_P$ = output stem position $Y_P$ = O when stem fully extended $F_P$ = output force $F_A$ = input force $M_A$ = mechanical advantage $L_H$ = input thrust rod connection radius $L_A$ = output thrust link connection radius $L_L$ = thrust link length $$\alpha = \text{Sin}^{-1}\left(\frac{L_A \text{Sin } \phi}{L_L}\right)$$

Therefore the force and motion equations are
$F_P = F_A \times MA$ $$MA = \frac{L_H \text{Cos } \theta}{L_A(\text{Sin } \phi + \text{Cos } \phi \text{ Tan}\alpha)}$$

And the actuator output stroke is
$Y_P = L_L \text{Cos}\alpha_o + L_A \text{Cos}\phi_o - L_L \text{Cos}\alpha - L_A \text{Cos}\phi$

We claim:

1. An actuator for stroking a valve having a body and a plug stem projecting on an axis therefrom and shiftable between initial and final limit positions, comprising
   a yoke attached to said body and received over said plug stem;
   a powerhead fixedly associated with said yoke;
   an input thrust rod extending into said yoke from said powerhead and shifted by controlled fluid pressures on said powerhead; and
   a variable force linkage between said thrust rod and said plug stem, said linkage comprising
   a support shaft mounted in said yoke on said plug stem axis,
   a main lever pivotally mounted on said support shaft for rotating about said plug stem axis,
   a pivotal connection of said thrust rod to said main lever at a selected radius from said support shaft and at a selected angle from said plug stem axis,
   an output thrust link pivotally connected at its one end for shifting said plug stem, and
   a pivotal connection of the other output thrust link end to said main lever at a selected radius from said support shaft and at a selected angle from said plug stem axis,
   said link-lever connection separated from said rod-lever connection by a least one of their said selected radii and angles being differently chosen,
   for valve closing mechanical advantage of the output stroking of said thrust link over the input stroking of said thrust rod, and
   such that in valve closing the actuator output shifting of said plug stem by said output thrust link is at an increasingly varying rate of change of force relative to the actuator input rotation of said main lever by said input thrust rod.

2. An actuator according to claim 1, and
   a stem connector rigidly axially extending said stem and to which said link is pivotably connected, and
   a yoke bearing slidingly receiving said stem connector and supporting that against any side thrust of said link.

3. An actuator according to claim 1 wherein said lever has a plane extent and angular orientation to project from said shaft to both sides of said shaft axis, and
   means enabling the pivotal connecting of said link to said lever at either side of said stem axis, whereby the shifting of said valve by said rod is selectively either pressure-to-open or pressure-to-close.

4. The actuator of claim 1, wherein said powerhead is arranged for said input thrust rod to have a direction of movement generally at right angles to said stem axis.

5. The actuator of claim 1, wherein said powerhead comprises
   enclosing casing means,
   a diaphram sealed between said case means,
   plate or cup means engaging said rod to one diaphram side,
   means admitting control fluid pressure to said powerhead at the other diaphram side, and
   spring means compressed between said powerhead and said one diaphram side.

6. An actuator according to claim 1, and
   means for locating said pivotal connection of said output thrust link to said lever at different radii from said support shaft whereby for the same length stroking of said rod said linkage produces different length stroking of said stem, as variously desired for valves of different strokes.

7. An accuator according to claim 6, wherein said means for locating said rod and link connections to said lever at different radii are duplicated at both sides of said stem.

8. An actuator according to claim 1, and manually manipulable means for engaging or rotating said main lever to override or limit said valve shifting by said powerhead pressuring of said thrust rod.

9. The actuator of claim 1, wherein said pivotal connection of said one end of said output thrust link is on the stem axis, and wherein the link-lever connection radius and angle are so chosen that in said stroking said connection closely approaches said axis as said stem approaches its final position, whereby the maximum output force of said actuator is a multiple of the input force of said powerhead, and which is generated when said stem is fully extended as for closing a downseating valve.

10. The actuator of claim 1, wherein said radii and angles of said rod and link connections to said main lever are such that in relation to the input stroke of said rod the output stroke of said link decreases to a minimum when said stem is in its final, fully extended position whereby the controlled valve trim flow characteristic is modified away from linear towards equal percentage.

11. The actuator of claim 1, wherein the angular relationship of the initial limit and final limit stroke positions of said rod and link, and wherein the change of said angular relationship as determined by said radii and by the length of said link, is such that
at the initial limit stroke position there is a mechanical advantage of greater than one,
at the final limit stroke position there is a mechanical advantage of less than infinity,
and intermediate said initial and final limit stroke positions the rate of change of mechanical advantage increases upon approaching full extension of said stem or stem connector from said support shaft.

12. The actuator of claim 1, and
a hand wheel continuously connected to said actuator so as by its manipulation to rotate said main lever and thereby to position said valve stem,
said hand wheel being connected to said linkage at a linkage point such that only low rim force is required for the rotating of said hand wheel to position said stem.

13. The actuator of claim 12 wherein the main lever is keyed to said support shaft, and wherein said hand wheel is arranged to rotate said shaft.

14. The actuator of claim 12, wherein said hand wheel comprises
a screw supported in said yoke at right angles to said shaft,
a crosshead threaded on said screw for shifting relative to said shaft by rotation of said screw, and
shaft mounted means engaged by said crosshead and rotatively interlocked with said main lever.

15. The actuator of claim 14, wherein said shaft mounted means comprise a shaft turning lever having a crosshead receiving opening of a radial and angular extent such that said hand wheel has a neutral position of crosshead disengagement with said shaft lever and from which said crosshead is bi-directionally shiftable by hand wheel rotation to engage said lever to move said stem in either direction.

16. The actuator of claim 1, wherein the powerhead is at a yoke side and wherein said thrust rod extends generally normally into said yoke and has freedom of pivoting movement in the plane of, as well as freedom of reciprocating movement normal to, said shaft axis, and wherein the positions of said thrust rod connection at said initial and final limit positions of said plug stem are at opposite sides of said stem axis.

17. The actuator of claim 16, wherein said thrust rod connection positions at said initial and final plug stem positions are at substantially equal opposite angles from said stem axis.

18. The actuator of claim 1, wherein the actuator is additionally characterized by variable stiffness, and wherein the relative radii and angles of said separated rod and link connections to said main lever are further chosen such that at the final limit position of said plug the stiffness of said powerhead is increased at said plug substantially by the square of said mechanical advantage.

19. An actuator for a control valve having a stem reciprocating on an axis comprising
a yoke mountable at the valve and in line with said axis;
a powerhead mounted on said yoke and comprising
a flexible diaphragm arranged for rolling responsive to control fluid pressures thereon and
an input thrust rod extending from said diaphragm into said yoke and for shifting by said diaphragm generally normally to said stem axis;
a support shaft journalled in said yoke on said stem axis;
a main lever rotatable on said shaft about said stem axis;
said input thrust rod pivotally connected to said main lever at a selected radius from said shaft and at a selected angle from said stem axis;
an axially extending stem connector;
means in said yoke for reciprocating support of said stem connector; and
an output thrust link pivotally connected at its one end for shifting said stem connector;
said output thrust link pivotally connected at its other end to said main lever at a selected radius from said support shaft and at a selected angle from said stem axis;
the main lever connection of said output thrust link separated from the main lever connection of said input thrust rod by at least one of their said selected radii and angles being differently chosen,
for valve closing mechanical advantage of the output shifting of said stem connector over the input shifting of said thrust rod, and
such that said mechanical advantage of the output thrust of said stem connector relative to the input thrust of said powerhead rod changes at a varying rate which increases as said stem connector closely approaches it full extended position of seating a down-closing valve.

* * * * *

UNITED STATES PATENT AND TRADEMARK OFFICE
CERTIFICATE OF CORRECTION

PATENT NO. : 4,050,670
DATED : September 27, 1977
INVENTOR(S) : Karl S. Borg and Gareth A. Keith It is certified that error appears in the above-identified patent and that said Letters Patent are hereby corrected as shown below:

In Column 6, line 2 change "plug stem" to --support shaft--.

In Column 8, line 31 change "stem" to --shaft--.

Signed and Sealed this

Twentieth Day of February 1979

[SEAL]

Attest:

RUTH C. MASON
Attesting Officer

DONALD W. BANNER
Commissioner of Patents and Trademarks